J. B. SUESS.
LENS FOR AUTOMOBILE HEADLIGHTS.
APPLICATION FILED OCT. 8, 1917.

1,269,978.

Patented June 18, 1918.

Inventor
John B. Suess
By his Attorney
C. D. Haskins

UNITED STATES PATENT OFFICE.

JOHN B. SUESS, OF SEATTLE, WASHINGTON.

LENS FOR AUTOMOBILE-HEADLIGHTS.

1,269,978.  Specification of Letters Patent.  Patented June 18, 1918.

Application filed October 8, 1917. Serial No. 195,467.

*To all whom it may concern:*

Be it known that I, JOHN B. SUESS, a citizen of the United States, residing at Seattle, in the county of King and State of Washington, have invented a certain new and useful Improvement in Lenses for Automobile-Headlights, of which the following is a specification.

My invention relates to lenses for automobile head lights, and the object of my invention is to provide a glass lens which shall be adapted to be removably disposed to serve as the front wall of the lamp box of an automobile head light and which lens shall be of such character as shall cause it both to diffuse and soften the rays of light that project outwardly through it from said lamp box thus to prevent said head light from projecting a glaring light that tends to blind and confuse an observer who is in front of said head light.

I accomplish this object by making a lens in accordance with the accompanying drawings, wherein—

Figure 1:
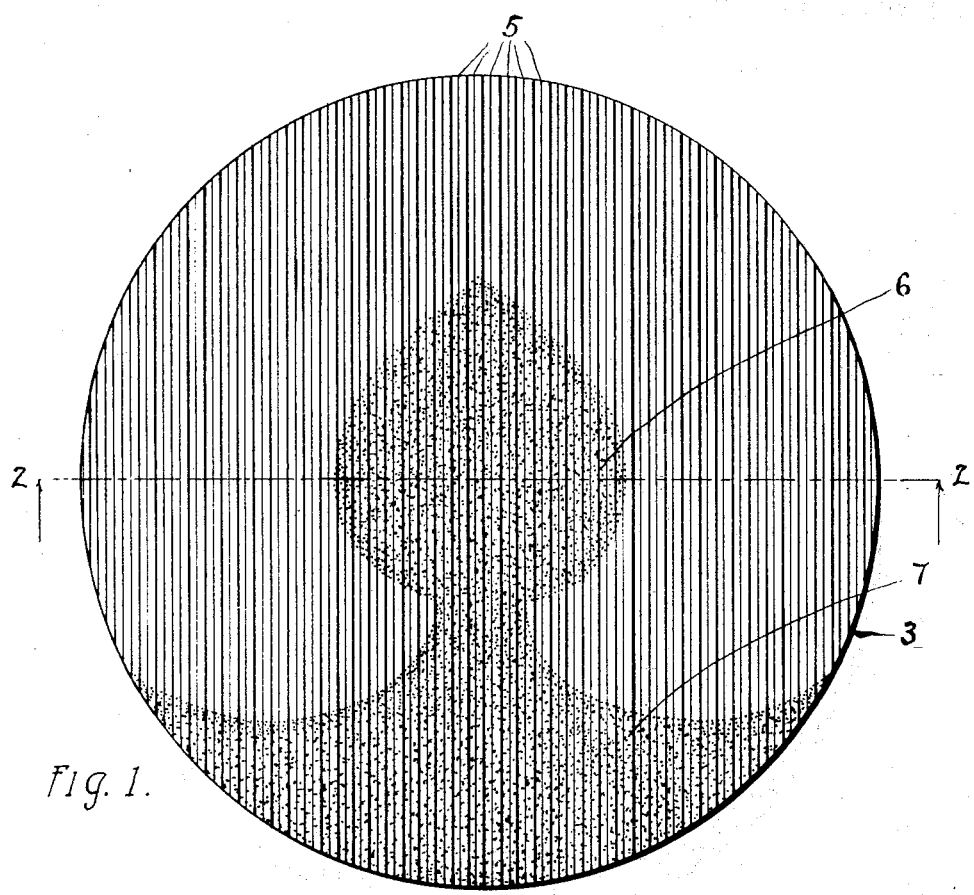
Figure 2:
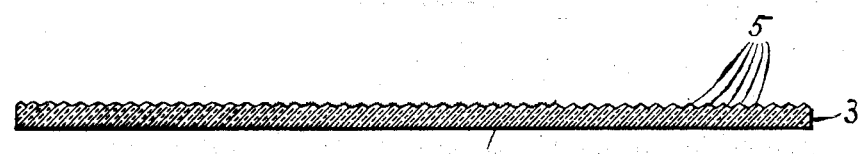

Figure 1 is a plan view of a lens embodying my invention; and Fig. 2 is a view of the same in cross-section on broken line 2, 2 of Fig. 1.

Referring to the drawings throughout which like reference numerals indicate like parts, 3 is a lens consisting of a circular glass plate whose rearward side 4 is smooth and flat and whose frontward side surface, throughout its whole area, is provided with integral triangular prisms, like prisms 5, which are disposed vertically each to be parallel with the others, the bases of adjacent ones thereof being contiguous.

The prisms 5, thus disposed to corrugate the entire surface of one side of the lens 3, in accordance with a well known physical law, serve to refract rays of light projected therethrough from a lamp disposed at a distance from its smooth rearward side 4 and to cause such rays to be evenly distributed to project in sidewise diverging lines from the frontward side of said lens 3.

When associated with the lamp box of an automobile head light that is provided with a parabolic reflector, the lens 3 is disposed therein incidentally to serve as the front wall thereof with its prisms 5 projecting outwardly and extending in vertical parallel lines, and the lamp within said lamp box is so disposed that the axis of said parabolic reflector shall extend through the flame or filament of said lamp and through the central portion 6 of the lens 3 in a manner well known.

In order to soften and diffuse the rays of light that are projected from the flame or filament of the lamp directly forward to and through the central portion 6 of said lens 3 thus to dim the glare of said rays, the surfaces of the A-shaped prisms 5 are roughened or matted, as by a sand blast, throughout the area of said central portion 6, the transverse dimension of which central portion 6, in a horizontal line, is substantially one-third of the distance across said lens 3, as indicated in Fig. 1.

In order to soften and diffuse the rays of light that are reflected by certain portions of said parabolic reflector to project them to and through the lower portion 7 of said lens 3, thus to dim the glare of said reflected rays, the surfaces of said A-shaped prisms 5, throughout the area of said lower portion 7, are roughened or matted, like the surfaces of said A-shaped prisms 5 within the area of said central portion 6, the shape of the area of said lower portion 7 being such that its middle portion extends upwardly to merge with the bottom edge of the central portion 6, as shown in Fig. 1, where all roughened or matted surfaces of the prisms 5 are indicated by a profusion of dots.

I am aware that lenses for automobile headlights have been heretofore made to embody a circular glass plate, one side of which is smooth and flat and whose other side is provided with contiguous unmatted prisms disposed in vertical lines throughout only the central and upper portion thereof, while the lower portion thereof is flat, matted and devoid of prisms, but such a lens does not prevent the glare of rays of light that are projected directly from the lamp's flame or filament itself to and through the central portion of said lens.

Manifestly, a square plate of glass may be substituted for the circular plate of glass and the dimensions of my lens may be changed without departing from the spirit of my invention.

What I claim is:

A lens of the class described, which consists of a glass plate one side of which is smooth and whose other side throughout its whole active area is provided with integral triangular prisms, the surfaces of said prisms being matted at the central portion in a horizontal line substantially one-third of the distance across said lens, said surfaces of said prisms being also matted throughout the area of the lower portion, the shape of the area of said lower matted portion being such that its middle portion extends upwardly to merge with the bottom edge of said central portion.

In witness whereof, I hereunto subscribe my name this 29th day of September, A. D. 1917.

JOHN B. SUESS.